United States Patent
Yuan

(10) Patent No.: US 10,264,491 B2
(45) Date of Patent: Apr. 16, 2019

(54) ENHANCED QUALITY OF SERVICE CLASS IDENTIFIER MODIFICATION

(71) Applicant: NOKIA SOLUTIONS AND NETWORKS OY, Espoo (FI)

(72) Inventor: Zhe Yuan, Beijing (CN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 40 days.

(21) Appl. No.: 15/301,183

(22) PCT Filed: Apr. 1, 2014

(86) PCT No.: PCT/CN2014/074521
§ 371 (c)(1),
(2) Date: Sep. 30, 2016

(87) PCT Pub. No.: WO2015/149271
PCT Pub. Date: Oct. 8, 2015

(65) Prior Publication Data
US 2017/0019816 A1    Jan. 19, 2017

(51) Int. Cl.
*H04W 24/04* (2009.01)
*H04W 28/02* (2009.01)
*H04W 28/24* (2009.01)

(52) U.S. Cl.
CPC .......... *H04W 28/24* (2013.01); *H04W 24/04* (2013.01); *H04W 28/0268* (2013.01)

(58) Field of Classification Search
None
See application file for complete search history.

(56) References Cited

U.S. PATENT DOCUMENTS

| | | | |
|---|---|---|---|
| 2007/0243879 A1 | 10/2007 | Park et al. | |
| 2012/0250660 A1 | 10/2012 | Karlsson | |
| 2014/0341021 A1* | 11/2014 | Han | H04L 47/2425 370/230 |
| 2015/0365963 A1* | 12/2015 | Won | H04W 28/0268 370/329 |
| 2016/0112896 A1* | 4/2016 | Karampatsis | H04W 28/0252 370/230.1 |

(Continued)

FOREIGN PATENT DOCUMENTS

| WO | 2007121368 A1 | 10/2007 |
|---|---|---|
| WO | WO 2007/121368 A1 | 10/2007 |

(Continued)

OTHER PUBLICATIONS

International Search Report dated Jan. 9, 2015 corresponding to International Patent Application No. PCT/CN2014/074521.

(Continued)

Primary Examiner — Jutai Kao
(74) Attorney, Agent, or Firm — Squire Patton Boggs (US) LLP

(57) ABSTRACT

There are provided measures for enhanced quality of service class identifier modification. Such measures exemplarily comprise receiving a message indicative of a quality of service class identifier, determining, whether said quality of service class identifier is supported by a communication endpoint, and transmitting a response based on a result of said determining.

4 Claims, 12 Drawing Sheets

(56) References Cited

U.S. PATENT DOCUMENTS

2016/0156676 A1* 6/2016 Verin ............... H04L 65/1016
709/228
2016/0337898 A1* 11/2016 Jeong ............... H04W 28/0289

FOREIGN PATENT DOCUMENTS

WO           2012136708 A1    10/2012
WO     WO 2014/047344 A1      3/2014

OTHER PUBLICATIONS

3GPP TS 23.203 V12.4.0 (Mar. 2014) Technical Specification 3rd Generation Partnership Project; Technical Specification Group Services and System Aspects; Policy and charging control architecture (Release 12).

3GPP TS 23.401 V12.4.0 (Mar. 2014) Technical Specification 3rd Generation Partnership Project; Technical Specification Group Services and System Aspects; General Packet Radio Service (GPRS) enhancements for Evolved Universal Terrestrial Radio Access Network(E-UTRAN) access (Release 12).

3GPP TS 23.402 V12.4.0 (Mar. 2014) Technical Specification 3rd Generation Partnership Project; Technical Specification Group Services and System Aspects; Architecture enhancements for non-3GPP accesses (Release 12).

3GPP TS 29.272 V12.4.0 (Mar. 2014) Technical Specification 3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 12).

3GPP TS 36.300 V12.1.0 (Mar. 2014) Technical Specification 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12).

3GPP TS 36.413 V12.1.0 (Mar. 2014) Technical Specification 3rd Generation Partnership Project; Technical Specification Group Radio Access Network; Evolved Universal Terrestrial Radio Access Network (E-UTRAN); S1 Application Protocol (S1AP) (Release 12).

3GPP S2-087524, Correction on HSS Initiated Subscribed QoS Modification procedure; 2008.

3GPP 3GPP TS 23.401 V8.18.0 (Mar. 2013), 3rd Generation Partnership Project; Technical Specification Group Services and System Aspects; General Packet Radio Service (GPRS) enhancements for Evolved Universal Terrestrial Radio Access Network (U-TRAN) access (Release 8).

European Search Report application No. 14888158.4 dated Nov. 6, 2017.

* cited by examiner

ENHANCED QUALITY OF SERVICE CLASS IDENTIFIER MODIFICATION

FIELD

The present invention relates to enhanced quality of service class identifier modification. More specifically, the present invention exemplarily relates to measures (including methods, apparatuses and computer program products) for realizing enhanced quality of service class identifier modification.

BACKGROUND

The present specification generally relates to an enhancement for home subscriber server (HSS) initiated subscribed quality of service (QoS) modification procedure in order to avoid an inappropriate QoS channel identifier (QCI) modification in HSS.

The related insert subscriber data procedure is used between a HSS and a mobility management entity (MME) for updating and/or requesting certain user data in the MME. One of the situations is due to administrative changes of the user data in the HSS and the user is now located in an MME, i.e., if the user was given a QCI in subscription and the QCI has been changed in HSS. QCI modification is one of the HSS initiated subscribed QoS modification procedures. In this procedure, the HSS shall send an insert subscriber data request to MME to replace the QCI stored in the MME with the new QCI sent, and the MME shall check whether the international mobile subscriber identity (IMSI) is known when receiving an insert subscriber data request. If it is known, the MME shall replace the QCI of the stored subscription data with the received QCI. If the QCI update of the subscription data succeeds in the MME, the Result-Code shall be set to DIAMETER_SUCCESS. The MME shall then acknowledge the insert subscriber data message by returning an insert subscriber data answer.

QCI is one of evolved packet system (EPS) subscribed QoS parameters of subscription data in HSS.

A QCI is a scalar that is used as a reference to access node-specific parameters that control bearer level packet forwarding treatment (e.g. scheduling weights, admission thresholds, queue management thresholds, link layer protocol configuration, etc.).

QCI can be configured in both HSS and evolved NodeB (eNB).

When QCI is modified in HSS, and there is related active packet data network (PDN) connection with the modified QoS profile, that is, when a user equipment (UE) is in ECM-CONNECTED state, a HSS initiated subscribed QoS modification procedure shall be invoked as depicted in $3^{rd}$ Generation Partnership Project (3GPP) technical specification (TS) 23.401.

A detailed description of procedures related to the subject of the present specification is given as follows.

A HSS initiated subscribed QoS modification for a General Packet Radio Service (GPRS) tunneling protocol (GTP)-based S5/S8 is depicted in FIG. 7, and the illustrated steps are as follows:

1. The HSS sends an insert subscriber data message (international mobile subscriber identity (IMSI), subscription data) to a MME. The subscription data includes EPS subscribed QoS (QCI, allocation and retention priority (ARP)) and the subscribed user equipment aggregate maximum bit rate (UE-AMBR) and aggregate maximum bit rate access point name APN-AMBR.

1a. The MME updates the stored subscription data and acknowledges the insert subscriber data message by returning an insert subscriber data acknowledgement message to the HSS.

2a. This step is executed in case the subscribed UE-AMBR has been modified.

If the subscribed UE-AMBR has been modified, the MME calculates a new UE-AMBR value and may then signal a modified UE-AMBR value to the eNB by using S1-AP UE context modification procedure.

If only the UE-AMBR has been modified, the HSS initiated subscribed QoS modification procedure ends after completion of the UE context modification procedure.

2b. In case the QCI and/or ARP and/or subscribed APN-AMBR has been modified and there is a related active PDN connection with the modified QoS profile, the MME sends an update bearer request message (EPS bearer identity, EPS bearer QoS, APN-AMBR) to a serving gateway (S-GW). The EPS bearer identity identifies the default bearer of the affected PDN connection. The EPS Bearer QoS contains the EPS subscribed QoS profile to be updated.

3. The S-GW sends the update bearer request message (EPS bearer identity, EPS bearer QoS, APN-AMBR) to the PDN gateway (GW).

4. If policy and charging control (PCC) infrastructure is deployed, the PDN GW informs a policy and charging rules function (PCRF) about the updated EPS bearer QoS. The PCRF sends new updated PCC decision to the PDN GW. This corresponds to the PCEF-initiated internet protocol connectivity access network (IP-CAN) session modification procedure as defined in TS 23.203.

The PCRF may modify the APN-AMBR and the QoS parameters (QCI and ARP) associated with the default bearer in the response to the PDN GW.

5. The PDN GW modifies the default bearer of each PDN connection corresponding to the APN for which subscribed QoS has been modified. The PDN GW then sends the update bearer request message (EPS bearer identity, EPS bearer QoS, TFT, APN-AMBR) to the S-GW.

6. If the QCI and/or ARP parameter(s) have been modified, steps 3 to 10, as described in association with FIG. 9, are invoked.

7. The S-GW acknowledges the bearer modification to the PDN GW by sending an update bearer response message (EPS bearer identity). If the bearer modification fails, the PDN GW deletes the concerned EPS bearer.

8. The PDN GW indicates to the PCRF whether the requested PCC decision was enforced or not by sending a provision acknowledgment message.

A UE context modification procedure is depicted in FIGS. 8a and 8b.

The purpose of the UE context modification procedure is to modify the established UE context partly (e.g. with a security key or a subscriber profile ID for radio access technology (RAT)/frequency priority). The procedure uses UE-associated signaling.

FIG. 8a illustrates UE context modification procedure in case of a successful operation.

A UE CONTEXT MODIFICATION REQUEST message may contain
 a Security Key information element (IE),
 a Subscriber Profile ID for RAT/Frequency priority IE,
 a UE Aggregate Maximum Bit Rate IE,
 a CS Fallback Indicator IE,
 a UE Security Capabilities IE.,
 a CSG Membership Status IE, a Registered LAI IE.

If the UE Aggregate Maximum Bit Rate IE is included in the UE CONTEXT MODIFICATION REQUEST message, the eNB shall replace the previously provided UE-AMBR by the received UE-AMBR in the UE context. The eNB shall further use the received UE-AMBR for non guaranteed bit rate (non-GBR) bearers for the concerned UE.

The eNB shall report, in a UE CONTEXT MODIFICATION RESPONSE message to the MME the successful update of the UE context.

After sending the UE CONTEXT MODIFICATION RESPONSE message, the procedure is terminated in the eNB.

FIG. 8b illustrates UE context modification procedure in case of an unsuccessful operation.

In case the UE context update cannot be performed successfully, the eNB shall respond with a UE CONTEXT MODIFICATION FAILURE message to the MME with an appropriate cause value in a Cause IE.

FIG. 9 illustrates a PDN GW initiated bearer modification with bearer QoS update.

The PDN GW initiated bearer modification procedure (including EPS bearer QoS update) for a GTP based S5/S8 is depicted in FIG. 9, and the illustrated steps are outlined below. This procedure is used in cases when one or several of the EPS bearer QoS parameters (QCI, guaranteed bit rate (GBR), maximum bit rate (MBR), or ARP) are modified (including the QCI or the ARP of the default EPS bearer, e.g. due to the HSS initiated subscribed QoS modification procedure as described above) or to modify the APN-AMBR. Modification of a QCI of resource type non-GBR to a QCI of resource type GBR and vice versa is not supported by this procedure.

It is noted that the QCI of an existing dedicated bearer should only be modified if no additional bearer can be established with the desired QCI.

It is further noted that steps 3-10 are common for architecture variants with GTP based S5/S8 and proxy mobile internet protocol (PMIP)-based S5/S8. For a PMIP-based S5/S8, procedure steps (A) and (B) are defined in TS 23.402. Steps 1, 2, 11 and 12 concern GTP based S5/S8.

1. If dynamic PCC is deployed, the PCRF sends a PCC decision provision (QoS policy) message to the PDN GW. This corresponds to the initial steps of the PCRF-initiated IP-CAN session modification procedure or to the PCRF response in a policy and charging enforcement function (PCEF) initiated IP-CAN session modification procedure as defined in TS 23.203, up to the point that the PDN GW requests IP-CAN bearer signaling. If dynamic PCC is not deployed, the PDN GW may apply local QoS policy.

2. The PDN GW uses this QoS policy to determine that the authorized QoS of a service data flow has changed or that a service data flow shall be aggregated to or removed from an active bearer. The PDN GW generates the traffic flow template (TFT) and updates the EPS bearer QoS to match the traffic flow aggregate. The PDN GW then sends an update bearer request message (procedure transaction identifier (PTI), EPS bearer identity, EPS bearer QoS, APN-AMBR, TFT) to the S-GW. The PTI parameter is used when the procedure was initiated by a UE requested bearer resource modification procedure. For APN-AMBR, the EPS bearer identity must refer to a non-GBR bearer.

3. The S-GW sends the update bearer request message (PTI, EPS bearer identity, EPS bearer QoS, TFT, APN-AMBR) to the MME. If the UE is in ECM-IDLE state, the MME will trigger a network triggered service request of step 3. In that case, the following steps 4 to 7 may be combined into a network triggered service request procedure or may be performed standalone.

4. The MME builds a session management request including the PTI, EPS bearer QoS parameters (excluding ARP), TFT, APN-AMBR and EPS bearer identity. If the UE has universal terrestrial radio access network (UTRAN) or global system for mobile communication (GSM) enhanced radio access network (GERAN) capabilities and the network supports mobility to UTRAN or GERAN, the MME uses the EPS bearer QoS parameters to derive the corresponding packet data protocol (PDP) context parameters QoS negotiated (R99 QoS profile), radio priority and packet flow id, and includes them in the session management request. If the UE indicated in the UE network capability that it does not support base station subsystem (BSS) packet flow procedures, then the MME shall not include the packet flow id. If the APN-AMBR has changed, the MME may update the UE-AMBR, if appropriate. The MME then sends the bearer modify request message (EPS bearer identity, EPS bearer QoS, session management request, UE-AMBR) to the eNB.

5. The eNB maps the modified EPS bearer QoS to the radio bearer QoS. It then signals a radio resource control (RRC) connection reconfiguration message (radio bearer QoS, session management request, EPS RB identity) to the UE. The UE shall store the QoS negotiated, radio priority, packet flow id, which it received in the session management request, for use when accessing via GERAN or UTRAN. If the APN-AMBR has changed, the UE stores the modified APN-AMBR value and sets the MBR parameter of the corresponding non-GBR PDP contexts (of this PDN connection) to the new value. The UE uses the uplink packet filter (UL TFT) to determine the mapping of traffic flows to the radio bearer. The UE may provide EPS bearer QoS parameters to the application handling the traffic flow(s). The application usage of the EPS bearer QoS is implementation dependent. The UE shall not reject the radio bearer modify request on the basis of the EPS bearer QoS parameters contained in the session management request. The UE shall set its temporary identity used in next update (TIN) to globally unique temporary identity ("GUTI"), if the modified EPS bearer was established before ISR activation.

6. The UE acknowledges the radio bearer modification to the eNB with a RRC connection reconfiguration complete message. The MME shall be prepared to receive this message either before or after the session management response message (sent in step 9).

7. The eNB acknowledges the bearer modification to the MME with a bearer modify response message (EPS bearer identity). With this message, the eNB indicates whether the requested EPS bearer QoS could be allocated or not.

8. The UE non-access stratum (NAS) layer builds a session management response including EPS bearer identity. The UE then sends a direct transfer message (session management response) to the eNB.

9. The eNB sends an uplink NAS transport message (session management response) to the MME.

10. Upon reception of the bearer modify response message in step 7 and the session management response message in step 9, the MME acknowledges the bearer modification to the S-GW by sending an update bearer response message (EPS bearer identity).

11. The S-GW acknowledges the bearer modification to the PDN GW by sending an update bearer response message (EPS bearer identity).

12. If the bearer modification procedure was triggered by a PCC decision provision message from the PCRF, the PDN GW indicates to the PCRF, whether the requested PCC decision (QoS policy) could be enforced or not by sending a provision acknowledgment message allowing the completion of the PCRF-initiated IP-CAN session modification procedure or the PCEF initiated IP-CAN session modification after the completion of IP-CAN bearer signaling.

It is noted that the exact signaling of steps 1 and 12 (e.g. for local break-out) is merely touched cursorily only for completeness.

According to the above mentioned and outlined procedures, QCI can be configured in both, HSS and eNB, that is, an inconsistency regarding the QCI may occur between HSS and eNB.

When UE has been registered to long term evolution (LTE) network and the UE is in ECM_CONNECTED state, when the QCI is modified in HSS, and the new QCI modified in HSS is not supported by the eNB, UE will get into dead loop of detach-attach rejection.

In detail,

1. QCI modification is successful between HSS and MME by insert subscriber data request and insert subscriber data answer, but
2. a failure bearer modify response sent from eNB indicates QCI not supported by eNB (E-RABModify is rejected by eNB with the cause "not-supported-qci-value (37)"), and
3. the UE is detached by MME (due to E-RABModify failure) and re-attaches again. The re-attachment, however, fails since the new QCI from HSS is not supported by eNB, so that the UE detaches again and re-attaches again and will never attach successfully (dead loop).

Hence, the problem arises that HSS initiated subscribed QoS modification procedure may result in unfavorable exclusion of UE's and undesirable user experiences.

Hence, there is a need to provide for enhanced quality of service class identifier modification.

SUMMARY

Various exemplary embodiments of the present invention aim at addressing at least part of the above issues and/or problems and drawbacks.

Various aspects of exemplary embodiments of the present invention are set out in the appended claims.

According to an exemplary aspect of the present invention, there is provided a method comprising receiving a message indicative of a quality of service class identifier, determining, whether said quality of service class identifier is supported by a communication endpoint, and transmitting a response based on a result of said determining.

According to an exemplary aspect of the present invention, there is provided a method comprising transmitting a message indicative of a quality of service class identifier, and receiving a response indicative of whether said quality of service class identifier is supported by a communication endpoint.

According to an exemplary aspect of the present invention, there is provided a method comprising receiving, at a communication endpoint, a context modification request including an information element comprising a quality of service class identifier, checking, at said communication endpoint, whether said quality of service class identifier is supported by said communication endpoint, and transmitting a context modification failure response stating a failure cause indicative of that said quality of service class identifier is not supported, if, as a result of said checking, said quality of service class identifier is not supported by said communication endpoint.

According to an exemplary aspect of the present invention, there is provided an apparatus comprising receiving means configured to receive a message indicative of a quality of service class identifier, determining means configured to determine, whether said quality of service class identifier is supported by a communication endpoint, and transmitting means configured to transmit a response based on a result of said determining means.

According to an exemplary aspect of the present invention, there is provided an apparatus comprising transmitting means configured to transmit a message indicative of a quality of service class identifier, and receiving means configured to receive a response indicative of whether said quality of service class identifier is supported by a communication endpoint.

According to an exemplary aspect of the present invention, there is provided an apparatus comprising receiving means configured to receive a context modification request including an information element comprising a quality of service class identifier, checking means configured to check whether said quality of service class identifier is supported by the apparatus, and transmitting means configured to transmit a context modification failure response stating a failure cause indicative of that said quality of service class identifier is not supported, if, as a result of said checking means, said quality of service class identifier is not supported by the apparatus.

According to an exemplary aspect of the present invention, there is provided a computer program product comprising computer-executable computer program code which, when the program is run on a computer (e.g. a computer of an apparatus according to any one of the aforementioned apparatus-related exemplary aspects of the present invention), is configured to cause the computer to carry out the method according to any one of the aforementioned method-related exemplary aspects of the present invention.

Such computer program product may comprise (or be embodied) a (tangible) computer-readable (storage) medium or the like on which the computer-executable computer program code is stored, and/or the program may be directly loadable into an internal memory of the computer or a processor thereof.

Any one of the above aspects enables solving at least part of the problems and drawbacks identified in relation to the prior art.

By way of exemplary embodiments of the present invention, there is provided enhanced quality of service class identifier modification. More specifically, by way of exemplary embodiments of the present invention, there are provided measures and mechanisms for realizing enhanced quality of service class identifier modification.

Thus, improvement is achieved by methods, apparatuses and computer program products enabling/realizing enhanced quality of service class identifier modification.

BRIEF DESCRIPTION OF THE DRAWINGS

In the following, the present invention will be described in greater detail by way of non-limiting examples with reference to the accompanying drawings, in which.

DETAILED DESCRIPTION OF DRAWINGS AND EMBODIMENTS OF THE PRESENT INVENTION

The present invention is described herein with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. As such, the description of exemplary embodiments given herein specifically refers to terminology which is directly related thereto. Such terminology is only used in the context of the presented non-limiting examples, and does naturally not limit the invention in any way. Rather, any other communication or communication related system deployment, etc. may also be utilized as long as compliant with the features described herein.

Hereinafter, various embodiments and implementations of the present invention and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

According to exemplary embodiments of the present invention, in general terms, there are provided measures and mechanisms for (enabling/realizing) enhanced quality of service class identifier modification.

In particular, the root cause of the above described problems is identified as that the QCI modified in HSS is not consistent to the QCI supported by eNB.

This results in that the UE may enter the dead loop of detach and re-attach rejection.

According to exemplary embodiments of the present invention, HSS is noticed as to whether the new QCI modified in HSS is supported by the involved eNB. If it is not supported, HSS fails the new QCI modification. Thus, the QCI of the UE in HSS still keeps the old one. UE may attach successfully with the old QCI.

Thereby, at least part of the problems and drawbacks identified in relation to the prior art is solved by exemplary embodiments of the present invention.

Figure 1:
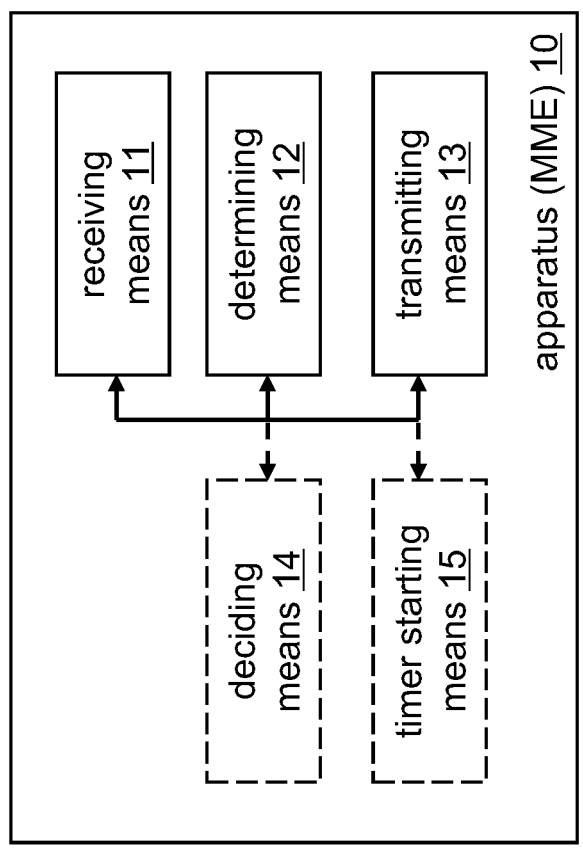
FIG. 1 is a block diagram illustrating an apparatus according to exemplary embodiments of the present invention.

FIG. 1 is a block diagram illustrating an apparatus according to exemplary embodiments of the present invention. The apparatus may be a MME comprising a receiving means 11, a determining means 12, and a transmitting means 13. The receiving means 11 receives a message indicative of a quality of service class identifier. The determining means 12 determines, whether said quality of service class identifier is supported by a communication endpoint. The transmitting means 13 transmits a response based on a result of said determining means 12.

According to further exemplary embodiments of the present invention, the apparatus as shown in FIG. 1 may (as shown in dashed lines) further comprise deciding means 14 and/or timer starting means 15, as explained below.

Figure 4:
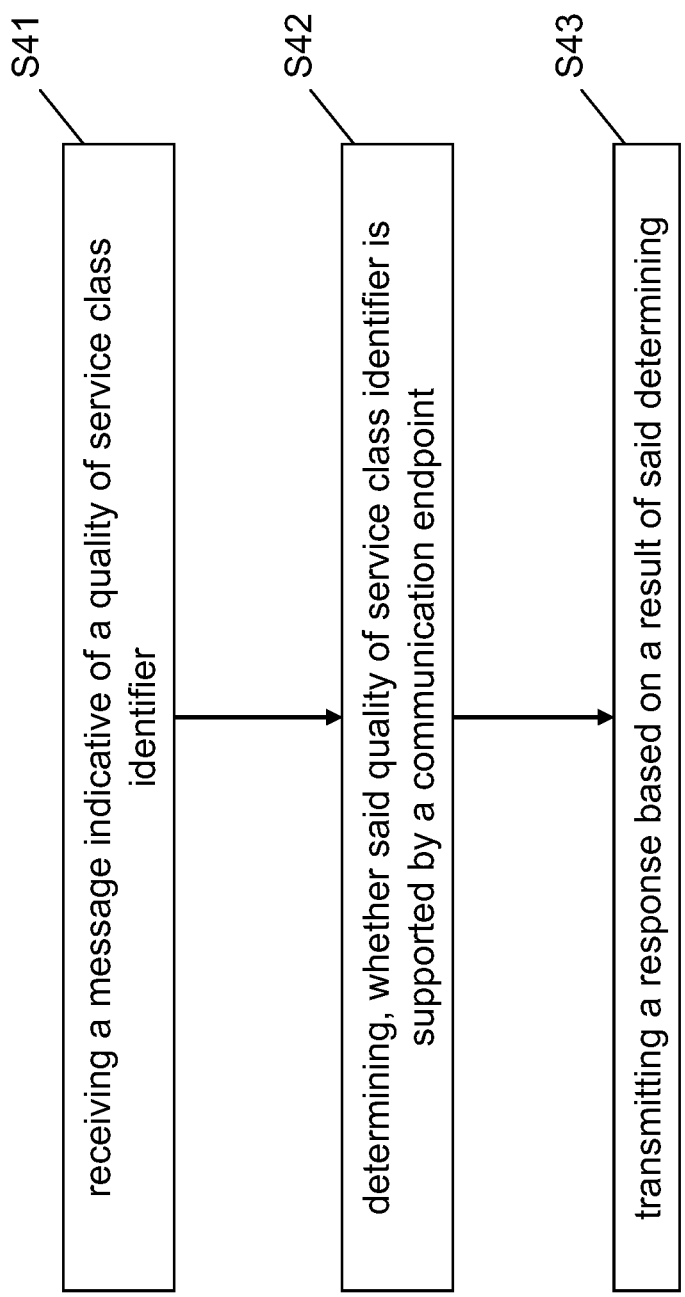
FIG. 4 is a schematic diagram of a procedure according to exemplary embodiments of the present invention.

FIG. 4 is a schematic diagram of a procedure according to exemplary embodiments of the present invention. The apparatus according to FIG. 1 may perform the method of FIG. 4 but is not limited to this method. The method of FIG. 4 may be performed by the apparatus of FIG. 1 but is not limited to being performed by this apparatus.

As shown in FIG. 4, a procedure according to exemplary embodiments of the present invention comprises an operation of receiving (S41) a message indicative of a quality of service class identifier, an operation of determining (S42), whether said quality of service class identifier is supported by a communication endpoint, and an operation of transmitting (S43) a response based on a result of said determining (S42).

Figure 2:
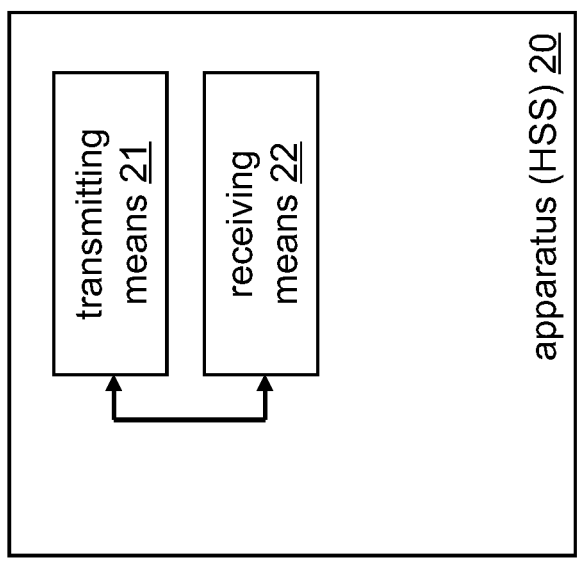
FIG. 2 is a block diagram illustrating an apparatus according to exemplary embodiments of the present invention.

FIG. 2 is a block diagram illustrating an apparatus according to exemplary embodiments of the present invention. The apparatus may be an HSS comprising a transmitting means 21 and a receiving means 22. The transmitting means 21 transmits a message indicative of a quality of service class identifier. The receiving means 22 receives a response indicative of whether said quality of service class identifier is supported by a communication endpoint.

Figure 5:
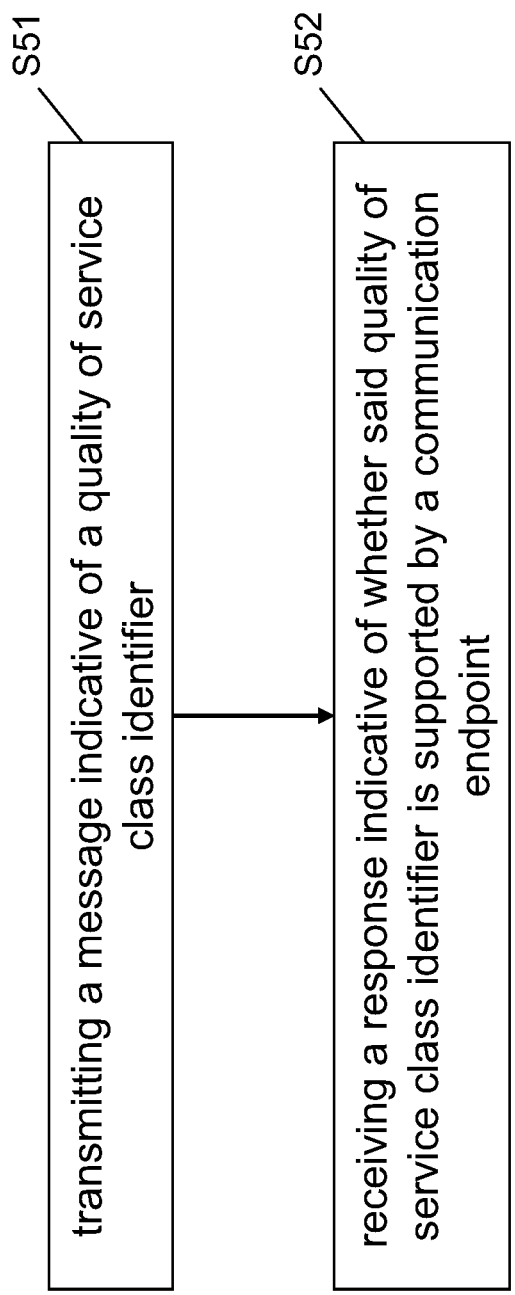
FIG. 5 is a schematic diagram of a procedure according to exemplary embodiments of the present invention.

FIG. 5 is a schematic diagram of a procedure according to exemplary embodiments of the present invention. The apparatus according to FIG. 2 may perform the method of FIG. 5 but is not limited to this method. The method of FIG. 5 may be performed by the apparatus of FIG. 2 but is not limited to being performed by this apparatus.

As shown in FIG. 5, a procedure according to exemplary embodiments of the present invention comprises an operation of transmitting (S51) a message indicative of a quality of service class identifier, and an operation of receiving (S52) a response indicative of whether said quality of service class identifier is supported by a communication endpoint.

According to a variation of the procedure shown in FIG. 4, in an exemplary method according to exemplary embodiments of the present invention, if it is determined that said quality of service class identifier is not supported by said communication endpoint, said transmitting may comprise transmitting a message indicative of inability to comply with said quality of service class identifier.

According to a variation of the procedure shown in FIG. 5, exemplary details of the receiving operation are given, which are inherently independent from each other as such.

Such exemplary receiving operation according to exemplary embodiments of the present invention may comprise an operation of receiving a message indicative of inability to comply with said quality of service class identifier.

Figure 10:
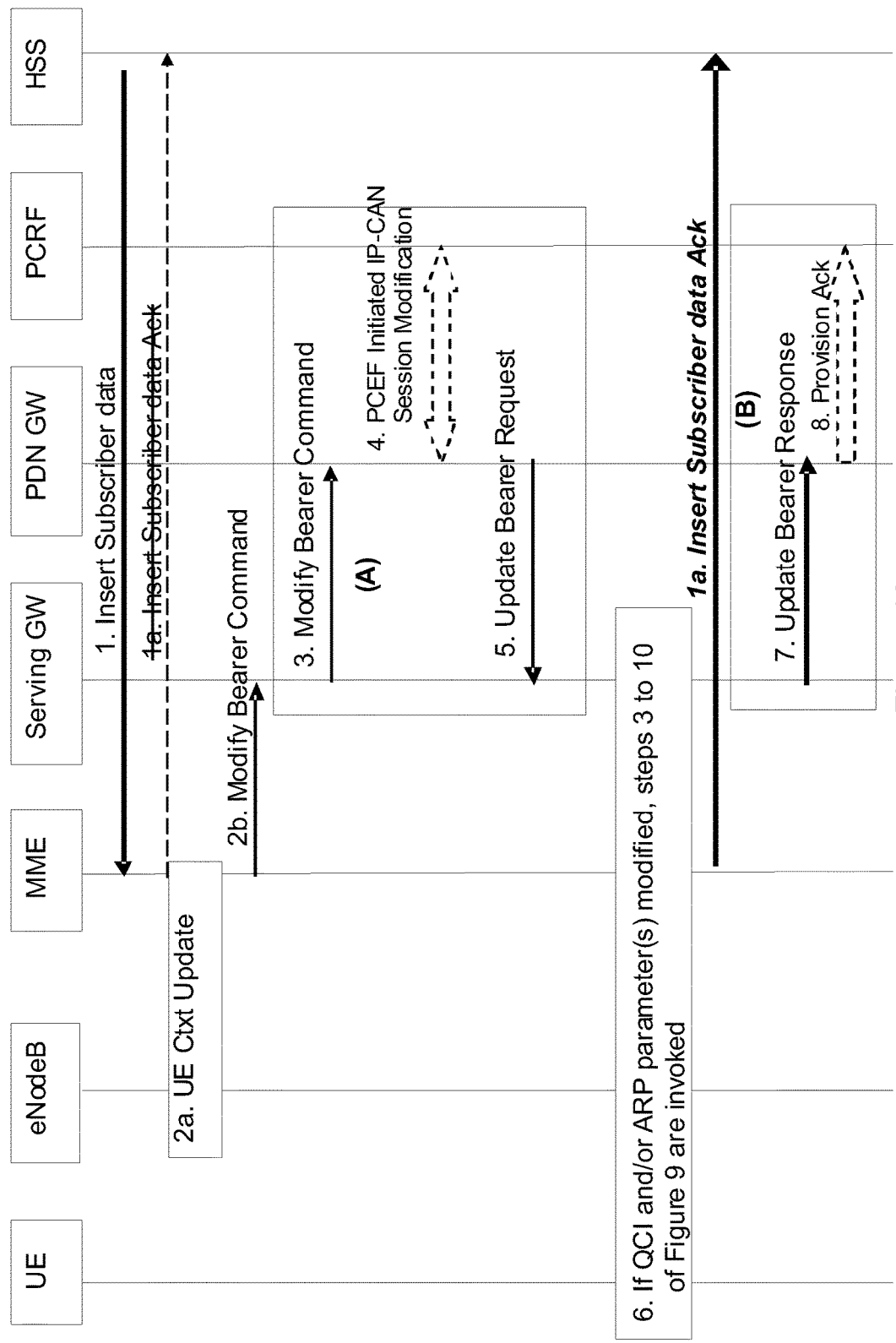
FIG. 10 shows a schematic diagram of signaling sequences according to exemplary embodiments of the present invention.

FIG. 10 shows a schematic diagram of signaling sequences according to an option to circumvent the abovementioned problems according to exemplary embodiments of the present invention.

As is shown in FIG. 10, when QCI is changed in HSS, according to current 3GPP specifications, MME shall send insert subscriber data acknowledgment immediately if the QCI update of the subscription data succeeds in the MME, as is depicted by the crossed out message of step 1a in FIG. 10.

Instead, according to exemplary embodiments of the present invention, MME returns the insert subscriber data acknowledgement message to the HSS upon reception of a bearer modify response message from eNB, as is illustrated by the new insert subscriber data acknowledgment (ack) message (shown in bold and italic) in new step 1a.

According to the exemplary embodiments of the present invention, MME sends insert subscriber data ack message based on the following conditions:

1. MME sends insert subscriber data ack to HSS with result-code DIAMETER_SUCCESS, if a successful bearer modify response is received from eNB, and
2. MME sends insert subscriber data ack to HSS with result-code DIAMETER_UNABLE_TO_COMPLY, if a failure bearer modify response indicating that QCI not supported in eNB is received from eNB, and the operation of changing QCI in HSS shall be failed.

In other words, according to a variation of the procedure shown in FIG. 4, exemplary details of the determining operation are given, which are inherently independent from each other as such.

Such exemplary determining operation according to the exemplary embodiments of the present invention may comprise an operation of transmitting, to said communication endpoint, a bearer modify request indicative of said quality of service class identifier, and an operation of receiving, from said communication endpoint, a bearer modify response indicative of whether said quality of service class identifier is supported by said communication endpoint.

Figure 7:
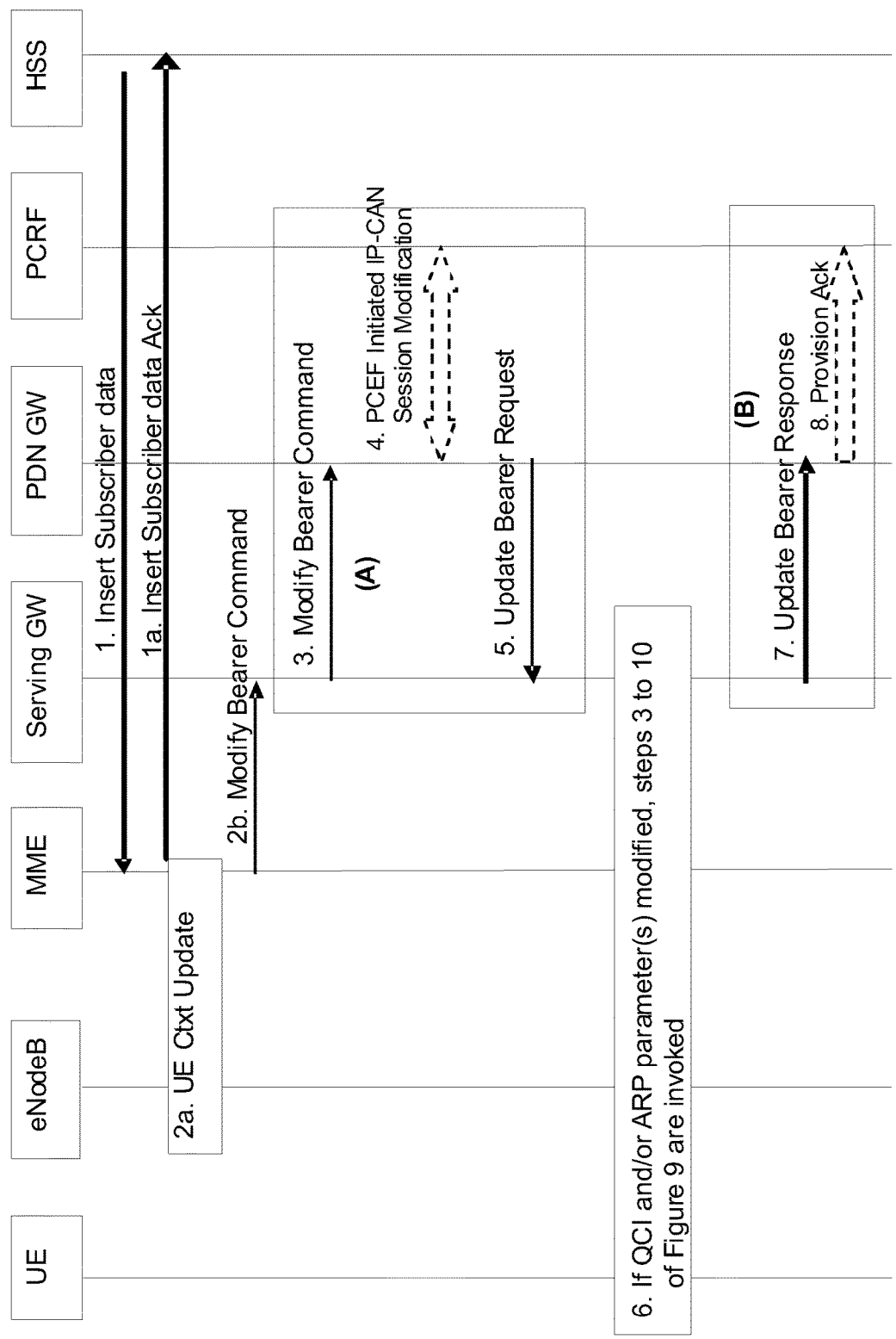
FIG. 7 shows a schematic diagram of signaling sequences.
Figure 8A:
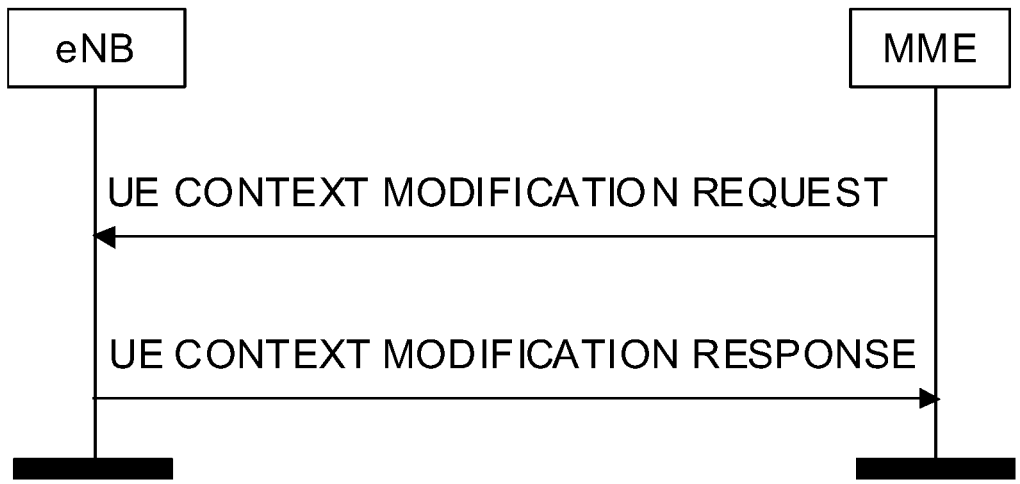
FIGS. 8a and 8b show schematic diagrams of signaling sequences.
Figure 8B:
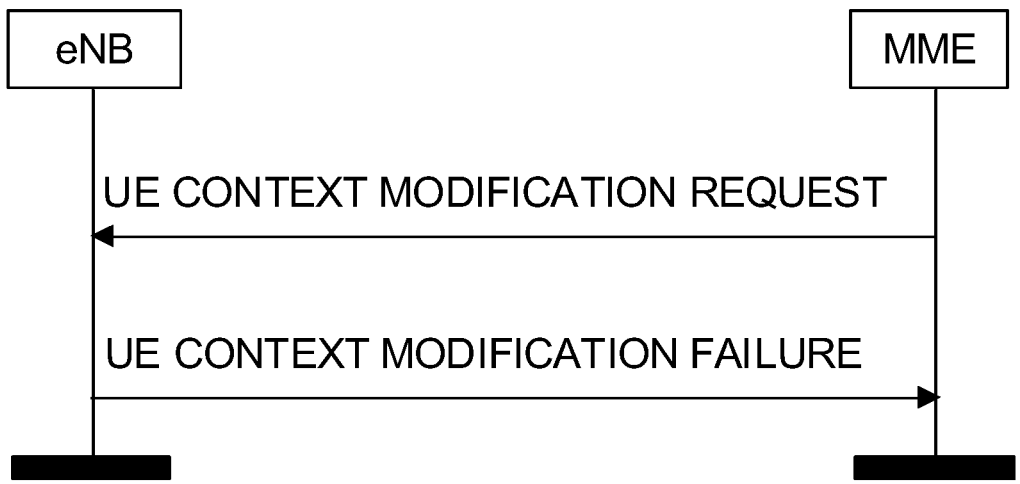
Figure 9:
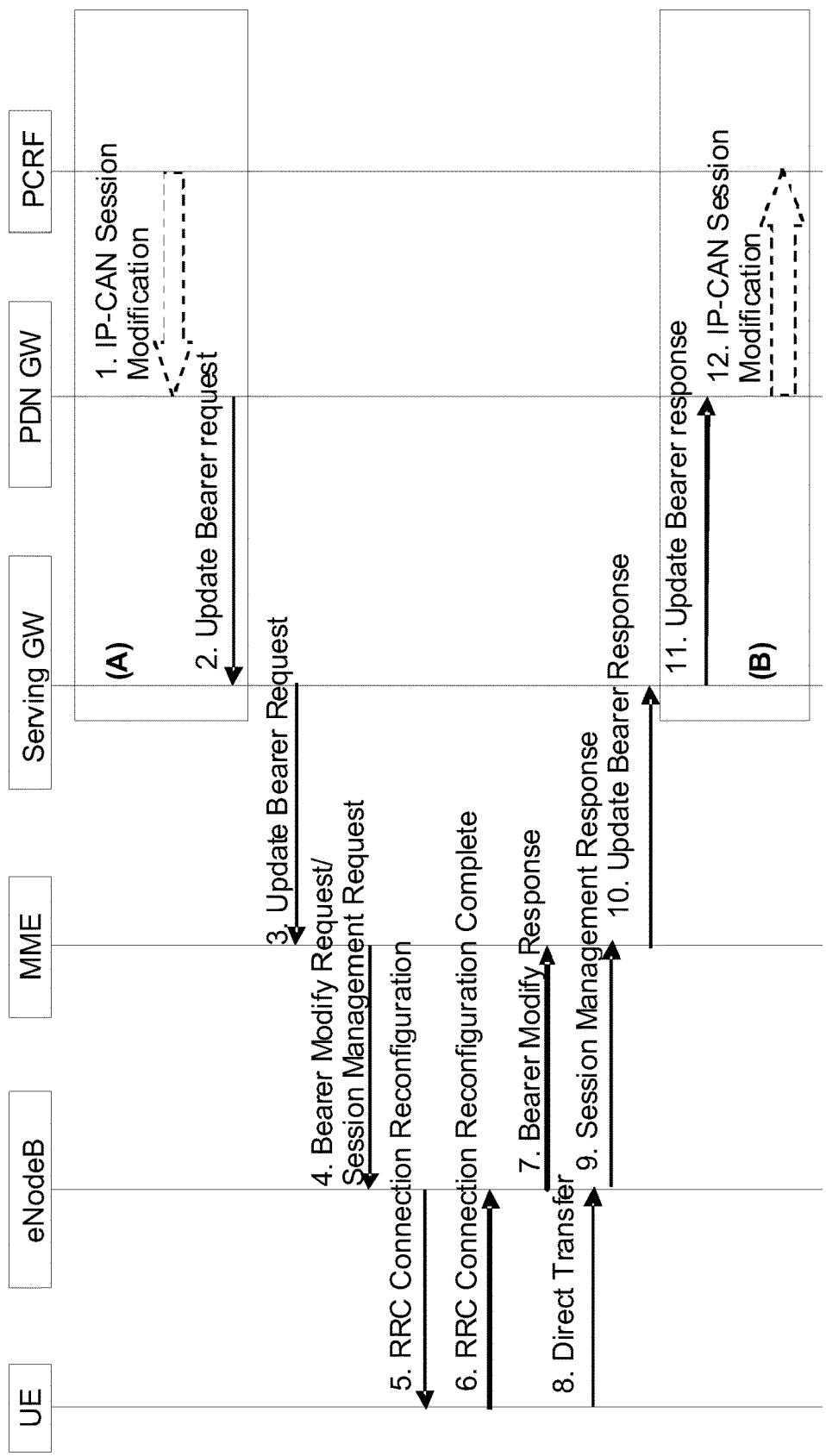
FIG. 9 shows a schematic diagram of signaling sequences.

In more detail, current 3GPP specifications may be changed in changing the MME behavior as stated above in that transmission of a insert subscriber data acknowledgment (ack) message is moved in the HSS initiated subscribed QoS modification procedure depicted in FIG. 7 from between steps 1 and 2a to between steps 6 and 7 of FIG. 7, as shown in FIG. 10.

Namely, the detailed behavior of the MME may be defined as follows:

When receiving an insert subscriber data request the MME shall check whether the IMSI is known.
If it is not known, a result code of DIAMETER_ERROR_USER_UNKNOWN shall be returned.
If it is known, the MME shall replace the specific part of the stored subscription data with the received data, or shall add the received data to the stored data.
When receiving the APN-Configuration-Profile AVP within the subscription-data AVP, the MME shall check the All-APN-Configurations-Included-Indicator value. If it indicates "All_APN_CONFIGURATIONS_INCLUDED", the MME shall delete all stored APN-Configurations and then store all received APN-Configurations. Otherwise, the MME shall check the Context-Identifier value of each received APN-Configuration. If the Context-Identifier of a received APN-Configuration matches a Context-Identifier of a stored APN-Configuration, the MME shall replace the stored APN-Configuration with the received APN-Configuration. If the Context-Identifier of a received APN-Configuration does not match a Context-Identifier of a stored APN-Configuration, the MME shall add the received APN-Configuration to the stored APN-Configurations. If QCI within EPS-Subscribed-QoS-Profile AVP within APN-Configuration-Profile AVP is changed, the MME or combined MME/SGSN shall wait for the eNB to notify that the new QCI is supported by bear modification response. Then, if the addition or update of the subscription data succeeds in the MME, the Result-Code shall be set to DIAMETER_SUCCESS. If QCI is not supported by eNB, the Result-Code shall be set to DIAMETER_UNABLE_TO_COMPLY. The MME shall then acknowledge the insert subscriber data message by returning an insert subscriber data answer.

It is noted that a software switch may be added in MME to enable or disable this function in MME.

According to this exemplary embodiments of the present invention, MME behaviour is thus changed, but no change in message content is proposed. MME delays to send the insert subscriber data ack until it receives bearer modify response.

Figure 11:
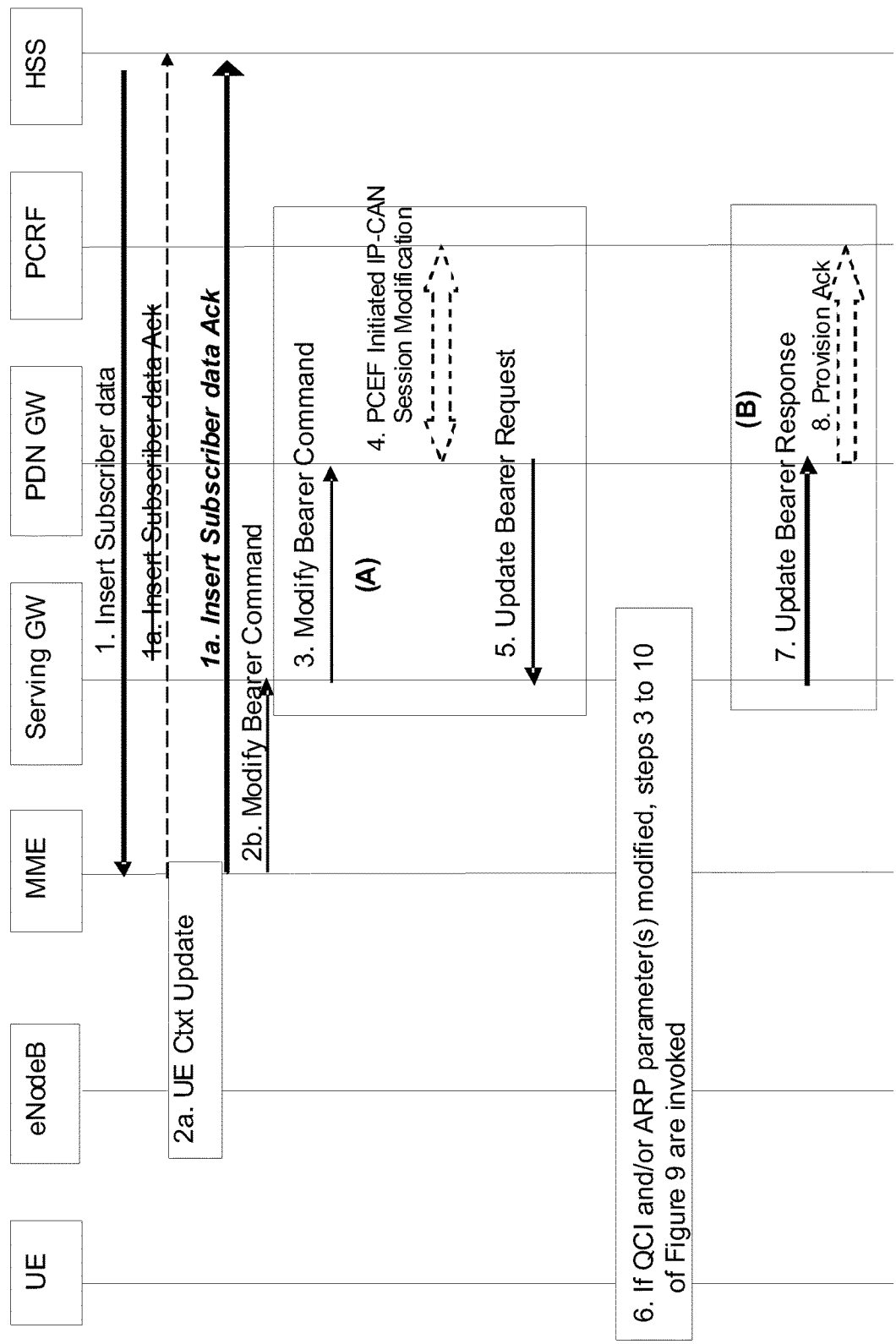
FIG. 11 shows a schematic diagram of signaling sequences according to exemplary embodiments of the present invention.

FIG. 11 shows a schematic diagram of signaling sequences according to a further option to circumvent the abovementioned problems according to exemplary embodiments of the present invention.

As is shown in FIG. 11, when QCI is modified in HSS, MME may use S1-AP UE context modification procedure to notice HSS whether the new QCI is supported by eNB before MME sends back insert subscriber data ack, similar to how the eNB processes UE AMBR change.

According to those exemplary embodiments, the MME invokes UE context modification procedure when QCI is modified in HSS. The new QCI may be contained in S1-AP message UE CONTEXT MODIFICATION REQUEST. The eNB judges whether the new QCI is supported by itself, and, if supported, replaces the old QCI by the received new QCI. If not, the eNB may send UE CONTEXT MODIFICATION FAILURE with CAUSE "Not supported QCI value". The changing QCI operation shall be failed in HSS. So the old QCI is still kept for UE. UE can attach successfully with the old QCI.

Hence, as is also shown in FIG. 11 and discussed in relation to FIG. 10, when QCI is changed in HSS, according to current 3GPP specifications, MME shall send insert subscriber data acknowledgment immediately if the QCI update of the subscription data succeeds in the MME, as is depicted by the crossed out message of step 1a in FIG. 11.

Instead, according to exemplary embodiments of the present invention, MME returns the insert subscriber data acknowledgement message to the HSS upon reception of information that the new QCI is supported by the eNB, as is illustrated by the new insert subscriber data acknowledgment (ack) message (shown in bold and italic) in new step 1a.

According to the exemplary embodiments of the present invention, if QCI is changed in HSS, MME invokes S1-AP UE context modification procedure, and then sends insert subscriber data ack based on the following conditions:

1. MME sends insert subscriber data ack to HSS with Result-Code DIAMETER_SUCCESS, if a successful UE CONTEXT MODIFICATION RESPONSE is received from eNB, and 2. MME sends insert subscriber data ack to HSS with Result-Code DIAMETER_UNABLE_TO_COMPLY, if a UE CONTEXT MODIFICATION FAILURE indicating QCI not supported in eNB, and the operation of changing QCI in HSS shall be failed.

In other words, according to a variation of the procedure shown in FIG. 4, exemplary details of the determining operation are given, which are inherently independent from each other as such.

Such exemplary determining operation according to exemplary embodiments of the present invention may comprise an operation of transmitting, to said communication endpoint, a context modification request including an information element comprising said quality of service class identifier, and an operation of receiving, from said communication endpoint, a context modification failure response stating a failure cause indicative of that said quality of service class identifier is not supported, if said quality of service class identifier is not supported by said communication endpoint.

Figure 3:
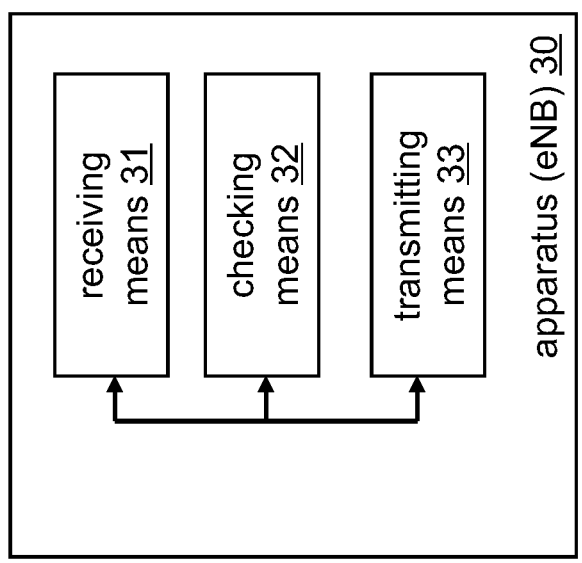
FIG. 3 is a block diagram illustrating an apparatus according to exemplary embodiments of the present invention.

Furthermore, FIG. 3 is a block diagram illustrating an apparatus according to exemplary embodiments of the present invention. The apparatus may be an eNB comprising a receiving means 31, a checking means 32, and a transmitting means 33. The receiving means 31 receives a context modification request including an information element comprising a quality of service class identifier. The checking means 32 checks whether said quality of service class identifier is supported by the apparatus. The transmitting means 33 transmits a context modification failure response stating a failure cause indicative of that said quality of service class identifier is not supported, if, as a result of said checking means 32, said quality of service class identifier is not supported by the apparatus.

Figure 6:
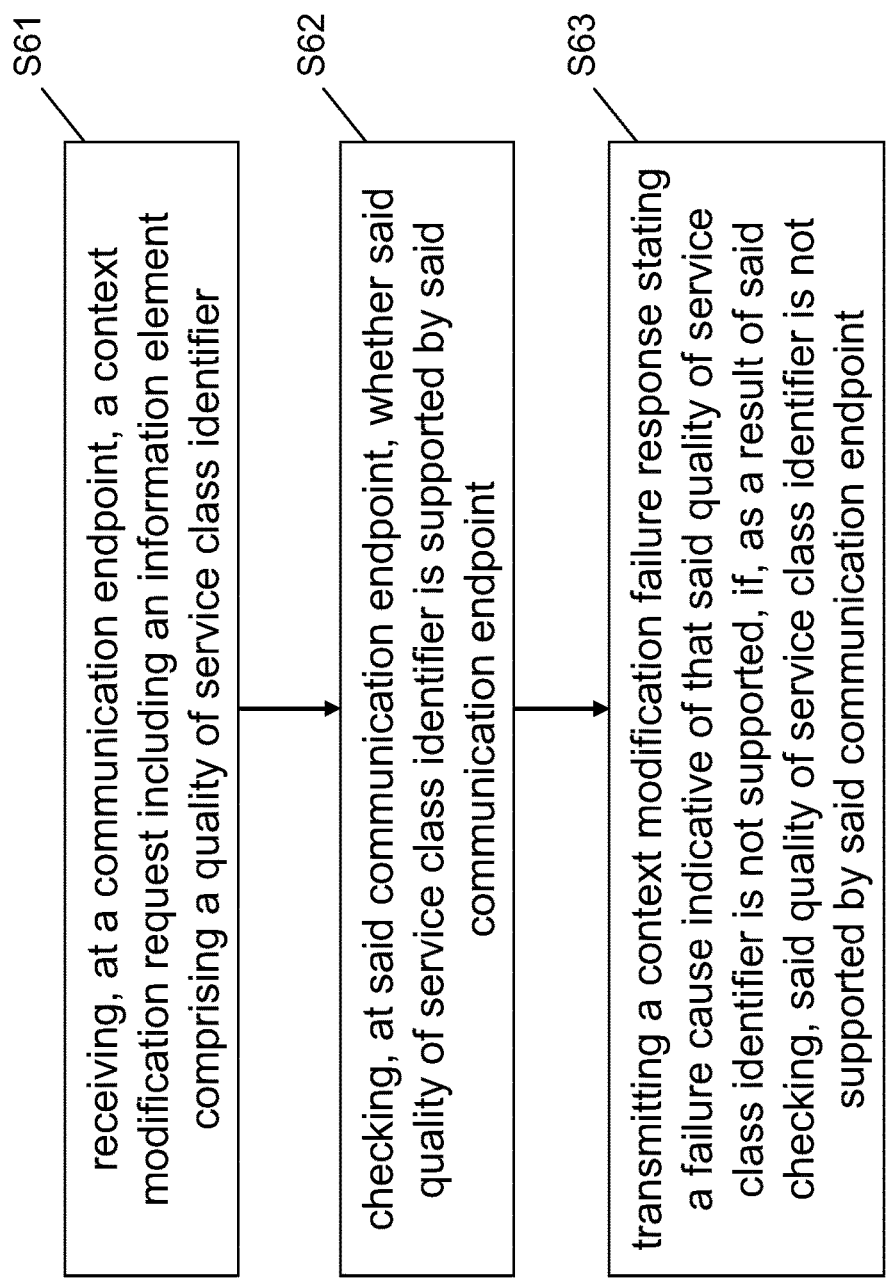
FIG. 6 is a schematic diagram of a procedure according to exemplary embodiments of the present invention.

FIG. 6 is a schematic diagram of a procedure according to exemplary embodiments of the present invention. The apparatus according to FIG. 3 may perform the method of FIG. 6 but is not limited to this method. The method of FIG. 6 may be performed by the apparatus of FIG. 3 but is not limited to being performed by this apparatus.

As shown in FIG. 6, a procedure according to exemplary embodiments of the present invention comprises an operation of receiving (S61), at a communication endpoint, a context modification request including an information element comprising a quality of service class identifier, an operation of checking (S62), at said communication endpoint, whether said quality of service class identifier is supported by said communication endpoint, and an operation of transmitting (S63) a context modification failure response stating a failure cause indicative of that said quality of service class identifier is not supported, if, as a result of said checking (S62), said quality of service class identifier is not supported by said communication endpoint.

In more detail, current 3GPP specifications may be changed in changing MME and eNB behaviors as stated above in that transmission of an insert subscriber data ack message is moved in the HSS initiated subscribed QoS modification procedure depicted in FIG. 7 from between steps 1 and 2a to between steps 2a (In step 2a it may be added that if the subscribed QCI has been modified, the MME may signal the modified QCI value to the eNB by using S1-AP UE context modification procedure to judge whether the new QCI is supported by the eNB) and 2b of FIG. 7, as shown in FIG. 11, and in that a new optional IE UE QCI is added into UE CONTEXT MODIFICATION REQUEST.

Namely, the detailed behavior of the MME may be defined as follows:

When receiving an insert subscriber data request the MME shall check whether the IMSI is known.

If it is not known, a result code of DIAMETER_ERROR_USER_UNKNOWN shall be returned.

If it is known, the MME shall replace the specific part of the stored subscription data with the received data, or shall add the received data to the stored data.

When receiving the APN-Configuration-Profile AVP within the subscription-data AVP, if a new QCI is present within EPS-Subscribed-QoS-Profile AVP, the MME or combined MME/SGSN shall invoke S1-AP UE context modification procedure to judge whether the new QCI is supported by the eNB. If the QCI is not supported by eNB, the Result-Code shall be set to DIAMETER_UNABLE_TO_COMPLY. If it is supported, the MME shall check the All-APN-Configurations-Included-Indicator value. If it indicates "All_APN_CONFIGURATIONS_INCLUDED", the MME shall delete all stored APN-Configurations and then store all received APN-Configurations. Otherwise, the MME shall check the Context-Identifier value of each received APN-Configuration. If the Context-Identifier of a received APN-Configuration matches a Context-Identifier of a stored APN-Configuration, the MME shall replace the stored APN-Configuration with the received APN-Configuration. If the Context-Identifier of a received APN-Configuration does not match a Context-Identifier of a stored APN-Configuration, the MME shall add the received APN-Configuration to the stored APN-Configurations. If the addition or update of the subscription data succeeds in the MME, the Result-Code shall be set to DIAMETER_SUCCESS. The MME shall then acknowledge the insert subscriber data message by returning an insert subscriber data answer.

A corresponding new UE CONTEXT MODIFICATION REQUEST sent by the MME to provide UE context information changes to the eNB (direction: MME to eNB) may be defined as follows:

| IE/Group Name | Presence | Range | IE type reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | reject |
| eNB UE S1AP ID | M | | 9.2.3.4 | | YES | reject |
| Security Key | O | | 9.2.1.41 | A fresh KeNB is provided after performing a key-change on the fly procedure | YES | reject |

-continued

| IE/Group Name | Presence | Range | IE type reference | Semantics description | Criticality | Assigned Criticality |
|---|---|---|---|---|---|---|
| | | | | in the MME, see TS 33.401 [15] | | |
| Subscriber Profile ID for RAT/Frequency priority | O | | 9.2.1.39 | | YES | ignore |
| UE Aggregate Maximum Bit Rate | O | | 9.2.1.20 | | YES | ignore |
| CS Fallback Indicator | O | | 9.2.3.21 | | YES | reject |
| UE Security Capabilities | O | | 9.2.1.40 | | YES | reject |
| CSG Membership Status | O | | 9.2.1.73 | | YES | ignore |
| Registered LAI | O | | 9.2.3.1 | | YES | ignore |
| Quality of Service Class Identifier | O | | 9.2.1.78 | | YES | reject |

A corresponding new Quality of Service Class Identifier may be defined as follows:

A QCI is a scalar that is used as a reference to access node-specific parameters that control bearer level packet forwarding treatment (e.g. scheduling weights, admission thresholds, queue management thresholds, link layer protocol configuration, etc.), and that have been pre-configured by the operator owning the access node (e.g. eNB).

| IE/Group Name | Presence | Range | IE type and reference | Semantics description |
|---|---|---|---|---|
| Quality of Service Class Identifier | M | | INTEGER (0 ... 15, 128 ... 254) | |

It is noted that a software switch may be added in MME to enable or disable this function in MME.

According to this exemplary embodiments of the present invention, both, eNB and MME behaviours are changed, and change in message content is proposed, and a faster procedure is achieved compared to the first mentioned option.

The present specification impacts, inter alia, the UE context modification procedure and the EPS QoS modification procedure.

Mentioned exemplary embodiments of the present invention can avoid the inappropriate QCI modification in HSS to a QCI not supported in eNB.

The above-described procedures and functions may be implemented by respective functional elements, processors, or the like, as described below.

In the foregoing exemplary description of the network entity, only the units that are relevant for understanding the principles of the invention have been described using functional blocks. The network entity may comprise further units that are necessary for its respective operation. However, a description of these units is omitted in this specification. The arrangement of the functional blocks of the devices is not construed to limit the invention, and the functions may be performed by one block or further split into sub-blocks.

When in the foregoing description it is stated that the apparatus (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

Figure 12:
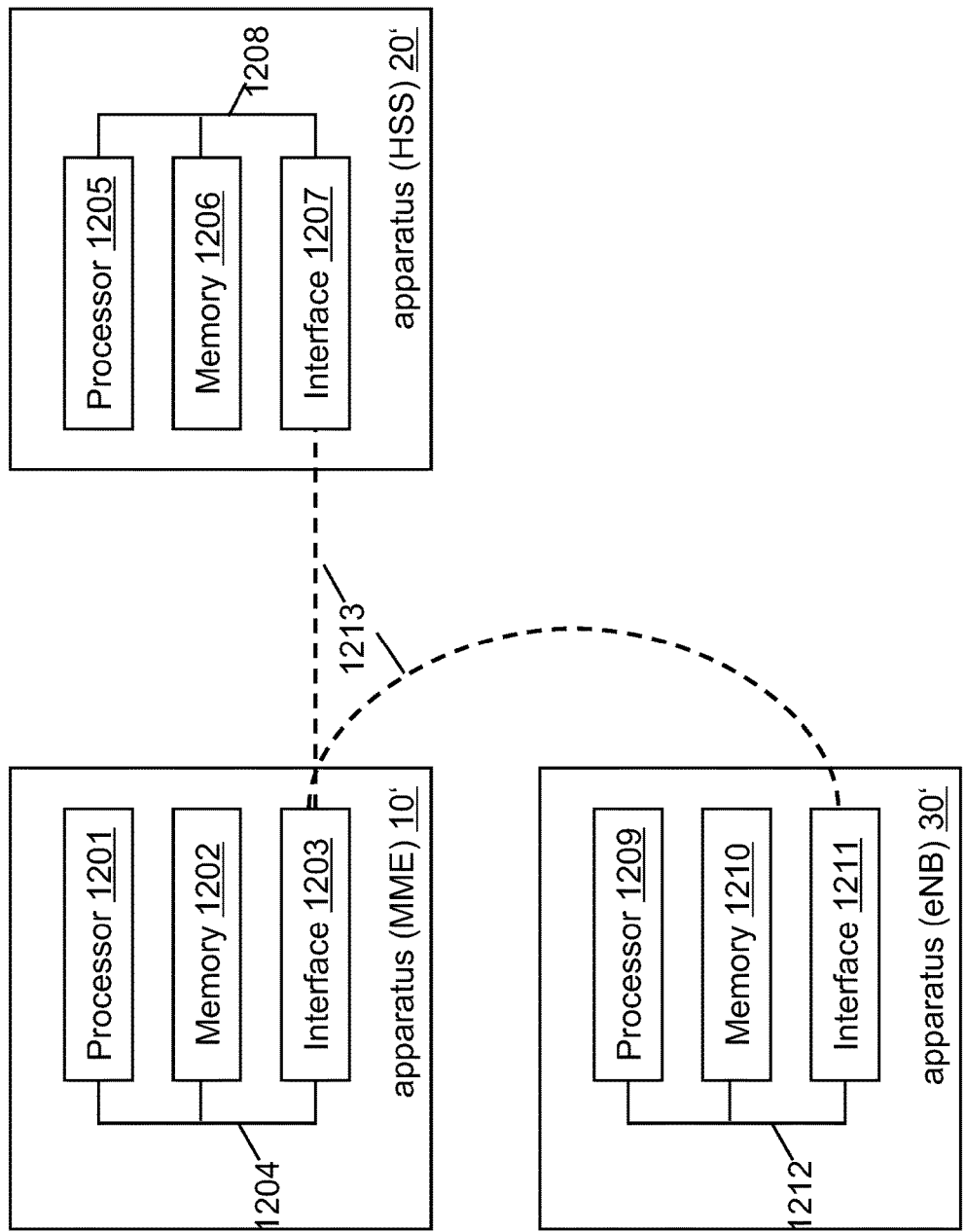
FIG. 12 is a block diagram alternatively illustrating apparatuses according to exemplary embodiments of the present invention.

In FIG. 12, an alternative illustration of apparatuses according to exemplary embodiments of the present invention is depicted. As indicated in FIG. 12, according to exemplary embodiments of the present invention, the apparatus (MME) 10' (corresponding to the MME 10) comprises a processor 1201, a memory 1202 and an interface 1203, which are connected by a bus 1204 or the like. Further, according to exemplary embodiments of the present invention, the apparatus (HSS) 20' (corresponding to the HSS 20) comprises a processor 1205, a memory 1206 and an interface 1207, which are connected by a bus 1208 or the like. Further, according to exemplary embodiments of the present invention, the apparatus (eNB) 30' (corresponding to the eNB 30) comprises a processor 1209, a memory 1210 and an interface 1211, which are connected by a bus 1212 or the like, and the apparatuses may be connected via link 1213, respectively.

The processor 1201/1205/1209 and/or the interface 1202/1206/1210 may also include a modem or the like to facilitate communication over a (hardwire or wireless) link, respectively. The interface 1202/1206/1210 may include a suitable transceiver coupled to one or more antennas or communication means for (hardwire or wireless) communications with the linked or connected device(s), respectively. The interface 1202/1206/1210 is generally configured to communicate with at least one other apparatus, i.e. the interface thereof.

The memory 1202/1206/1210 may store respective programs assumed to include program instructions or computer program code that, when executed by the respective processor, enables the respective electronic device or apparatus to operate in accordance with the exemplary embodiments of the present invention.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

According to exemplary embodiments of the present invention, an apparatus representing the MME 10 comprises at least one processor 1201, at least one memory 1202 including computer program code, and at least one interface 1203 configured for communication with at least another apparatus. The processor (i.e. the at least one processor 1201, with the at least one memory 1202 and the computer program code) is configured to perform receiving a message indicative of a quality of service class identifier (thus the apparatus comprising corresponding means for receiving), to perform determining, whether said quality of service class identifier is supported by a communication endpoint (thus the apparatus comprising corresponding means for determining), and to perform transmitting a response based on a result of said determining (thus the apparatus comprising corresponding means for transmitting).

According to exemplary embodiments of the present invention, an apparatus representing the HSS 20 comprises at least one processor 1205, at least one memory 1206 including computer program code, and at least one interface 1207 configured for communication with at least another apparatus. The processor (i.e. the at least one processor 1205, with the at least one memory 1206 and the computer program code) is configured to perform transmitting a message indicative of a quality of service class identifier (thus the apparatus comprising corresponding means for transmitting), and to perform receiving a response indicative of whether said quality of service class identifier is supported by a communication endpoint (thus the apparatus comprising corresponding means for receiving).

According to exemplary embodiments of the present invention, an apparatus representing the eNB 30 comprises at least one processor 1209, at least one memory 1210 including computer program code, and at least one interface 1211 configured for communication with at least another apparatus. The processor (i.e. the at least one processor 1209, with the at least one memory 1210 and the computer program code) is configured to perform receiving, at a communication endpoint, a context modification request including an information element comprising a quality of service class identifier (thus the apparatus comprising corresponding means for receiving), to perform checking, at said communication endpoint, whether said quality of service class identifier is supported by said communication endpoint (thus the apparatus comprising corresponding means for checking), and to perform transmitting a context modification failure response stating a failure cause indicative of that said quality of service class identifier is not supported, if, as a result of said checking, said quality of service class identifier is not supported by said communication endpoint (thus the apparatus comprising corresponding means for transmitting).

For further details regarding the operability/functionality of the individual apparatuses, reference is made to the above description in connection with any one of FIGS. 1 to 11, respectively.

For the purpose of the present invention as described herein above, it should be noted that method steps likely to be implemented as software code portions and being run using a processor at a network server or network entity (as examples of devices, apparatuses and/or modules thereof, or examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined network entity or network register, or any one of their respective units/means) can be implemented as individual devices, units or means, but this does not exclude that they are implemented in a distributed fashion throughout the system, as long as the functionality of the device, unit or means is preserved;

an apparatus like the user equipment and the network entity/network register may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for enhanced quality of service class identifier modification. Such measures exemplarily comprise receiving a message indicative of a quality of service class identifier, determining, whether said quality of service class identifier is supported by a communication endpoint, and transmitting a response based on a result of said determining.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

LIST OF ACRONYMS AND ABBREVIATIONS

3GPP 3$^{rd}$ Generation Partnership Project
ARP allocation and retention priority
BSS base station subsystem
eNB evolved NodeB
EPS evolved packet system
GBR guaranteed bit rate
GERAN global system for mobile communication enhanced radio access network
GPRS General Packet Radio Service
GSM global system for mobile communication
GTP tunneling protocol
GUTI globally unique temporary identity
GW gateway
HSS home subscriber server
IE information element
IMSI international mobile subscriber identity
IDA insert subscriber data answer
IP-CAN internet protocol connectivity access network
LTE long term evolution
MBR maximum bit rate
MME mobility management entity
NAS non-access stratum
non-GBR non guaranteed bit rate
PCC policy and charging control
PCEF policy and charging enforcement function
PCRF policy and charging rules function
PDN packet data network
PDP packet data protocol
PMIP proxy mobile internet protocol
PTI procedure transaction identifier
QCI quality of service channel identifier
QoS quality of service
RAT radio access technology
RRC radio resource control
S-GW serving gateway
TFT traffic flow template
TIN temporary identity used in next update
TS technical specification
UE user equipment
UE-AMBR user equipment aggregate maximum bit rate
UTRAN universal terrestrial radio access network

What is claimed is:

1. A method comprising:
receiving, from a home subscriber server (HSS), a message indicative of a modified quality of service class identifier (QCI),
determining whether said modified QCI is supported by an access node (eNB), and
transmitting, to the HSS, a message indicative of inability to comply with said modified QCI if it is determined that said modified QCI is not supported by said eNB,
wherein said determining further comprises:
transmitting, to said eNB, a bearer modify request indicative of said modified QCI, and
receiving, from said eNB, a bearer modify response indicative of whether said modified QCI is supported by said eNB; or
transmitting, to said eNB, a context modification request including an information element comprising said modified QCI, and
receiving, from said eNB, a context modification failure response stating a failure cause indicative that said modified QCI is not supported by said eNB.

2. A computer program product embodied on a non-transitory computer-readable medium, said product comprising computer-executable computer program code which, when the program is run on a computer, is configured to cause the computer to carry out the method according to claim 1.

3. An apparatus comprising:
receiving means configured to receive, from a home subscriber server (HSS), a message indicative of a modified quality of service class identifier (QCI),
determining means configured to determine whether said modified QCI is supported by an access eNB, and
transmitting means configured to transmit a message indicative of inability to comply with said modified QCI if it is determined that said modified QCI is not supported by said eNB,
wherein said determining means are further configured to:
transmit, to said eNB, a bearer modify request indicative of said modified QCI, and
receive, from said eNB, a bearer modify response indicative of whether said modified QCI is supported by said eNB; or
transmit, to said eNB, a context modification request including an information element comprising said modified QCI, and
receive, from said eNB, a context modification failure response stating a failure cause indicative that said modified QCI is not supported by said eNB.

4. The apparatus according to claim 3, wherein
the apparatus operates as or at a mobility management entity of a cellular system, or
the apparatus operates in at least one of a LTE and a LTE-A cellular system.

* * * * *